United States Patent
Zhu et al.

(10) Patent No.: US 11,819,988 B2
(45) Date of Patent: Nov. 21, 2023

(54) LOCKING MECHANISM FOR ENABLING FISHING PLIER TO REMAIN CLOSED STATE

(71) Applicant: YANGZHOU YUANSHENG MACHINERY CO., LTD., Yangzhou (CN)

(72) Inventors: Zhenggao Zhu, Yangzhou (CN); Zhilin Xu, Yangzhou (CN)

(73) Assignee: YANGZHOU YUANSHENG MACHINERY CO., LTD., Yangzhou (CN)

( * ) Notice: Subject to any disclaimer, the term of this patent is extended or adjusted under 35 U.S.C. 154(b) by 315 days.

(21) Appl. No.: 17/277,718

(22) PCT Filed: Nov. 1, 2019

(86) PCT No.: PCT/CN2019/115165
§ 371 (c)(1),
(2) Date: Mar. 18, 2021

(87) PCT Pub. No.: WO2020/103678
PCT Pub. Date: May 28, 2020

(65) Prior Publication Data
US 2021/0347013 A1    Nov. 11, 2021

(30) Foreign Application Priority Data
Nov. 21, 2018    (CN) .......................... 201821918599.7

(51) Int. Cl.
*B25B 7/14*    (2006.01)
*A01K 97/18*    (2006.01)

(52) U.S. Cl.
CPC ................ *B25B 7/14* (2013.01); *A01K 97/18* (2013.01)

(58) Field of Classification Search
CPC .... B25B 7/00; B25B 7/02; B25B 7/06; B25B 7/08; B25B 7/12; B25B 7/123; B25B 7/14; B25B 7/16; B25B 7/18; A01K 97/18
See application file for complete search history.

(56) References Cited

U.S. PATENT DOCUMENTS

| | | | |
|---|---|---|---|
| 5,033,338 A * | 7/1991 | Ford, Jr. .................. | B25B 7/16 81/324 |
| 5,367,774 A * | 11/1994 | Labarre ..................... | B25B 7/14 30/268 |
| 2008/0264216 A1 | 10/2008 | Duffy | |

FOREIGN PATENT DOCUMENTS

| | | |
|---|---|---|
| CN | 101850543 A | 10/2010 |
| CN | 204621868 U | 9/2015 |

(Continued)

*Primary Examiner* — Robert J Scruggs
(74) *Attorney, Agent, or Firm* — Bayramoglu Law Offices LLC

(57) ABSTRACT

A locking mechanism for enabling a fishing plier to remain a closed state includes a fixed plier handle and a movable plier handle. The middle portion of the fixed plier handle is integrally provided with a first rotating part, and the middle portion of the movable plier handle is integrally provided with a second rotating part. The first rotating part and the second rotating part are rotatably connected through a fixed shaft assembly. A knob is disposed on the outer side of the first rotating part. Straight slide grooves are disposed between the second rotating part and the first rotating part. The inner end surface of the knob is provided with a control groove. A locking pin is inserted between the straight slide groove on the second rotating part, the straight slide groove on the first rotating part, and the control groove of the knob.

4 Claims, 8 Drawing Sheets

(56) References Cited

FOREIGN PATENT DOCUMENTS

| CN | 205588174 U |   | 9/2016 |
|----|-------------|---|--------|
| CN | 106181807   | * | 12/2016 |
| CN | 106181807 A |   | 12/2016 |
| CN | 108568759 A |   | 9/2018 |
| CN | 208034466 U |   | 11/2018 |
| CN | 209095371 U |   | 7/2019 |

* cited by examiner

LOCKING MECHANISM FOR ENABLING FISHING PLIER TO REMAIN CLOSED STATE

CROSS REFERENCE TO THE RELATED APPLICATIONS

This application is the national phase entry of International Application No. PCT/CN2019/115165, filed on Nov. 1, 2019, which is based upon and claims priority to Chinese Patent Application No. 201821918599.7, filed on Nov. 21, 2018, the entire contents of which are incorporated herein by reference.

TECHNICAL FIELD

The present invention relates to the field of fishing gears, and more particularly, to a locking mechanism for enabling a fishing plier to remain a closed state.

BACKGROUND

The fishing plier is a commonly used fishing gear, and has various functions such as loop-opening, thread-cutting, hook-removing and so on. In order to facilitate the opening and closing during use, the fishing pliers are all provided with mechanisms of making them automatically open. As a result, the fishing pliers are always in an open state when they are not in use, which brings inconvenience to their carrying, storage and protection of cutting edges at thread-cutting points.

A fishing plier with a locking mechanism, disclosed in the patent numbered 201520292267.2, adopts a closed locking approach to achieve locking and unlocking by disposing a positioning pin on one side of a plier handle and moving the positioning pin along its axis to enter or leave the matched positioning hole on the other side. Since its movement in one direction is always achieved by a spring, when there are slight errors in holes on both sides, the movement may become insensitive, and it is easy to jam.

The spiral surface used to push the movement of the positioning pin on the knob is difficult to process and has a high cost. In order to enable the positioning pin to move smoothly and easily to enter or leave the positioning hole on the other side, it is necessary to arrange a certain clearance space between the positioning pin and both the guide hole and the positioning hole on the plier handle. This results that the gap of the opening of the plier in the locked state is still very large, without satisfactorily enabling the opening to be locked.

SUMMARY

The present invention provides a novel locking mechanism for enabling a fishing plier to remain a closed state. The fishing plier in the closed state is remained to be locked through a switch operation according to the present invention. Moreover, the structure is simple, the processing is convenient, the operation is flexible, and the gap of the opening in the locked state is very small.

The technical solution of achieving the above object is as follows. A locking mechanism for enabling a fishing plier to remain a closed state includes a fixed plier handle and a movable plier handle. The middle portion of the fixed plier handle is integrally provided with a first rotating part, and the middle portion of the movable plier handle is integrally provided with a second rotating part. The first rotating part and the second rotating part are rotatably connected through a fixed shaft assembly.

A knob is disposed on the outer side of the first rotating part and is rotatably mounted on the fixed shaft assembly. Straight slide grooves are disposed between the second rotating part and the first rotating part. The straight slide groove on the second rotating part and the straight slide groove on the first rotating part are overlapped with each other when the fixed plier handle and the movable plier handle are in a closed state. The inner end surface of the knob is provided with a control groove. A locking pin is inserted between the straight slide groove on the second rotating part, the straight slide groove on the first rotating part, and the control groove of the knob. One end of the straight slide groove of the second rotating part is provided with an arc groove, and the arc groove is communicated with the straight slide groove and takes a rotation center of the fixed shaft assembly as a center.

When the fixed plier handle and the movable plier handle are in the closed state, the knob is rotated to drive the locking pin to slide along the straight slide groove of the second rotating part and the straight slide groove of the first rotating part by the control groove. When the locking pin slides to the end of the straight slide groove far away from the arc groove, the fixed plier handle and the movable plier handle are in a closed and locked state. When the locking pin slides into the arc groove communicated with the straight slide groove, the arc groove slides along the locking pin to enable the movable plier handle to be in an openable and closable state.

Further, the fixed shaft assembly includes a fixed shaft and a fixed bolt threadedly connected to each other. The first rotating part and the second rotating part are rotatably mounted on the fixed shaft. The knob is rotatably mounted on the outer side of the first rotating part through the fixed bolt.

Further, an outer end of the fixed shaft is provided with a step, and a decorative ring is sandwiched between the step of the fixed shaft and the second rotating part.

Further, the control groove is an arc groove or a straight groove.

The present invention has the following advantages.

The fishing plier in the closed state is remained to be locked through a switch operation according to the present invention. Moreover, the structure is simple, the processing is convenient, the operation is flexible, and the gap of the opening in the locked state is very small.

DETAILED DESCRIPTION OF THE EMBODIMENTS

Embodiment I

Figure 1:
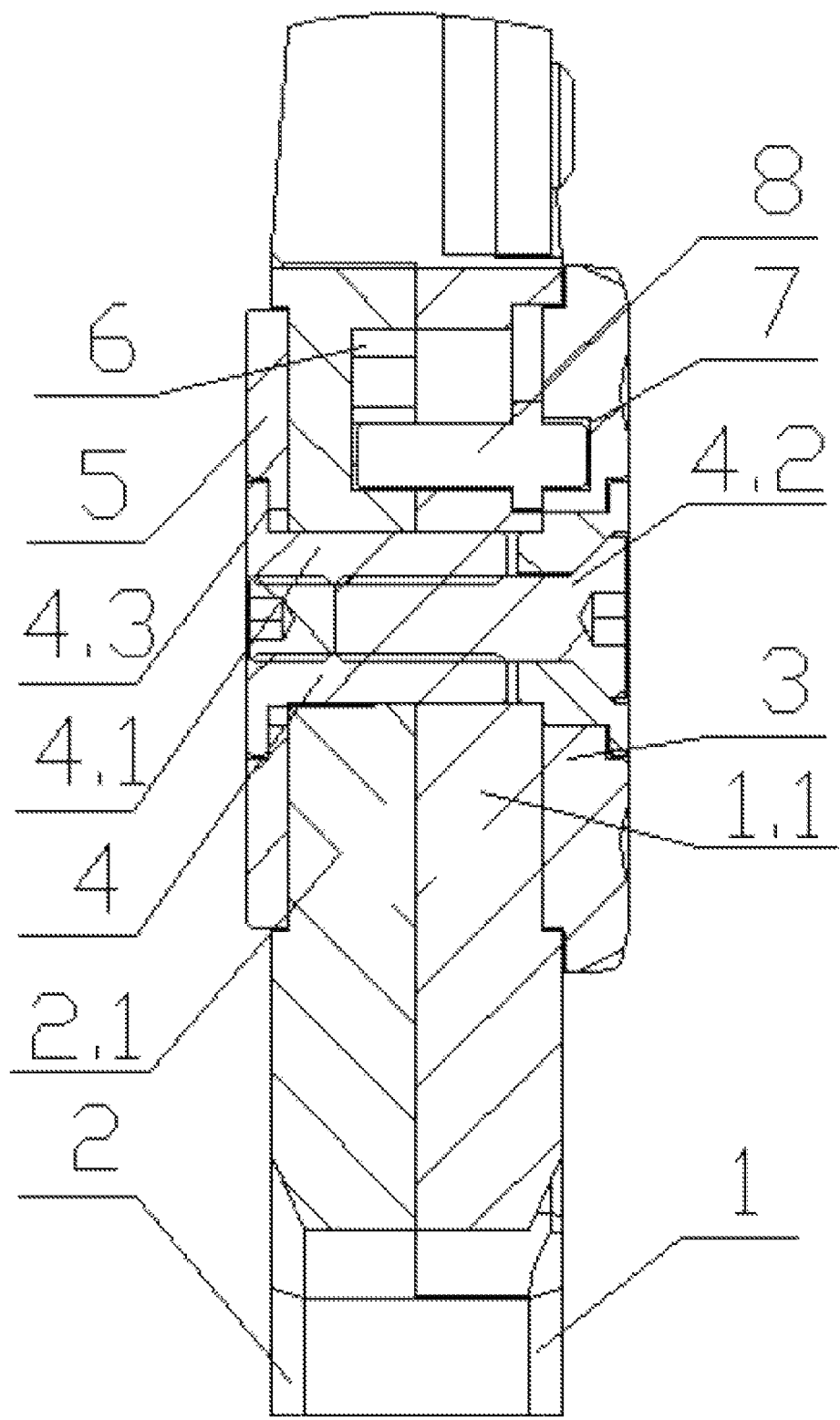
FIG. 1 is a structural schematic diagram of Embodiment I.
Figure 2:
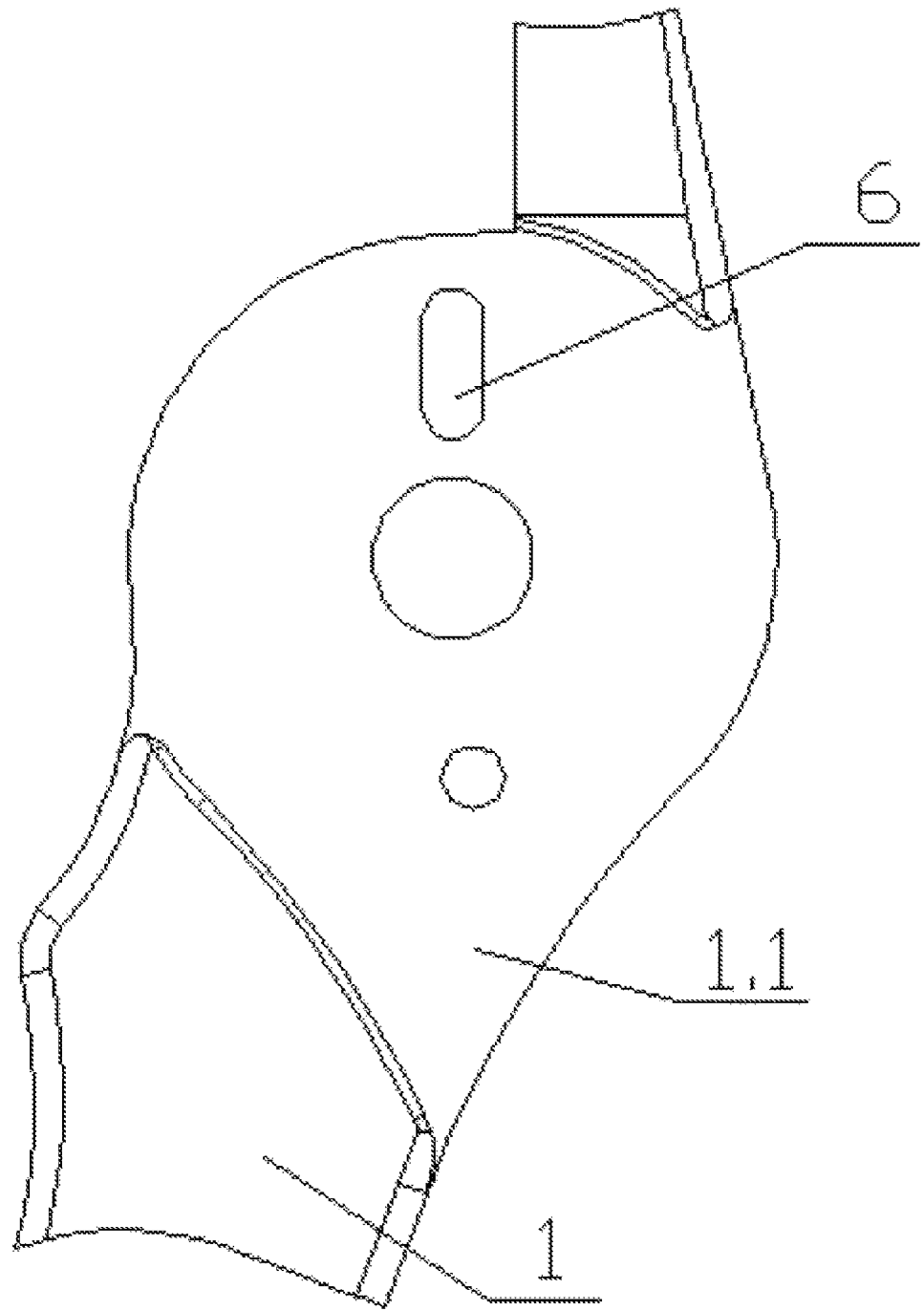
FIG. 2 is a structural schematic diagram of a first rotating part according to Embodiment I.
Figure 3:
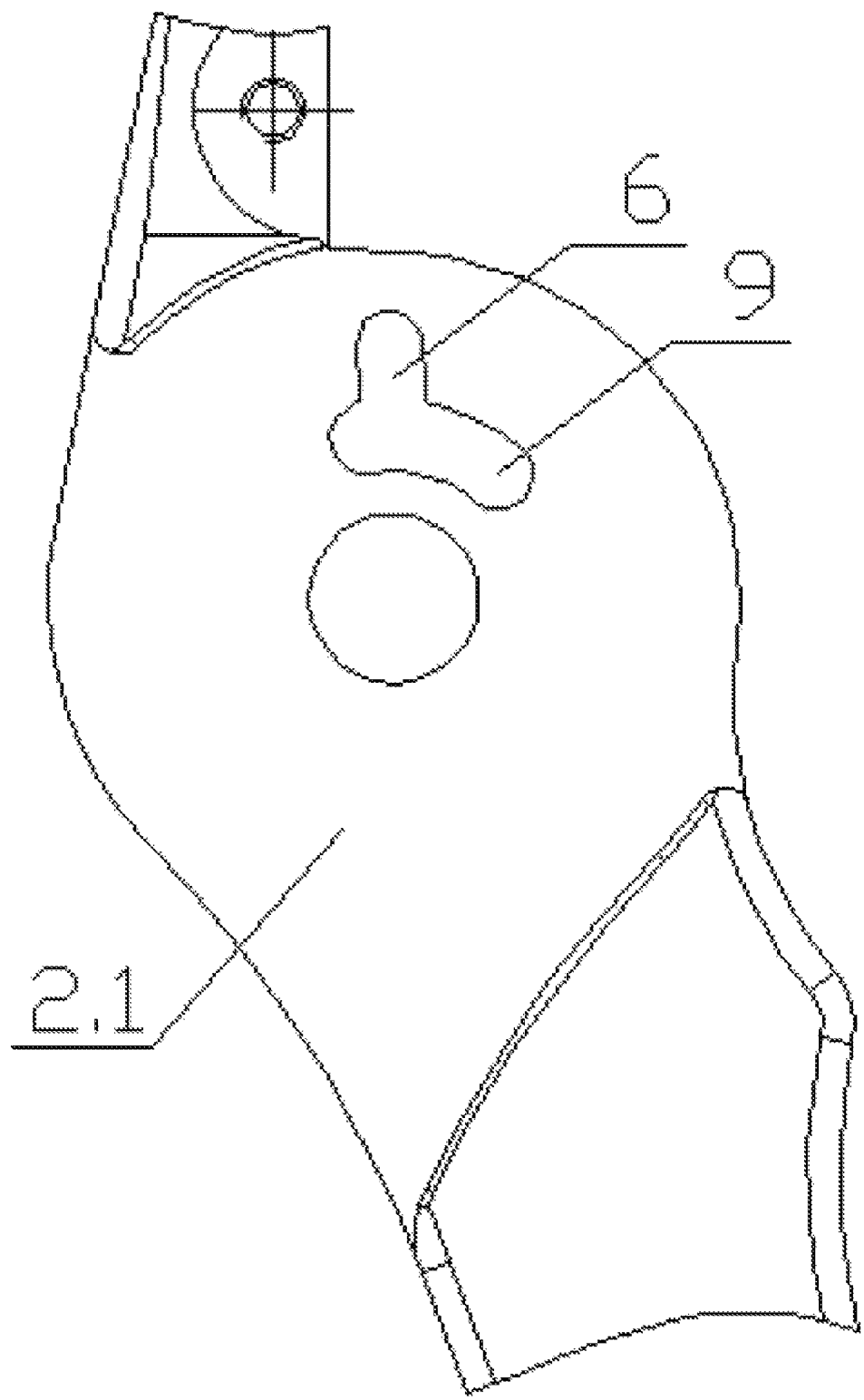
FIG. 3 is a structural schematic diagram of a second rotating part according to Embodiment I.
Figure 4:
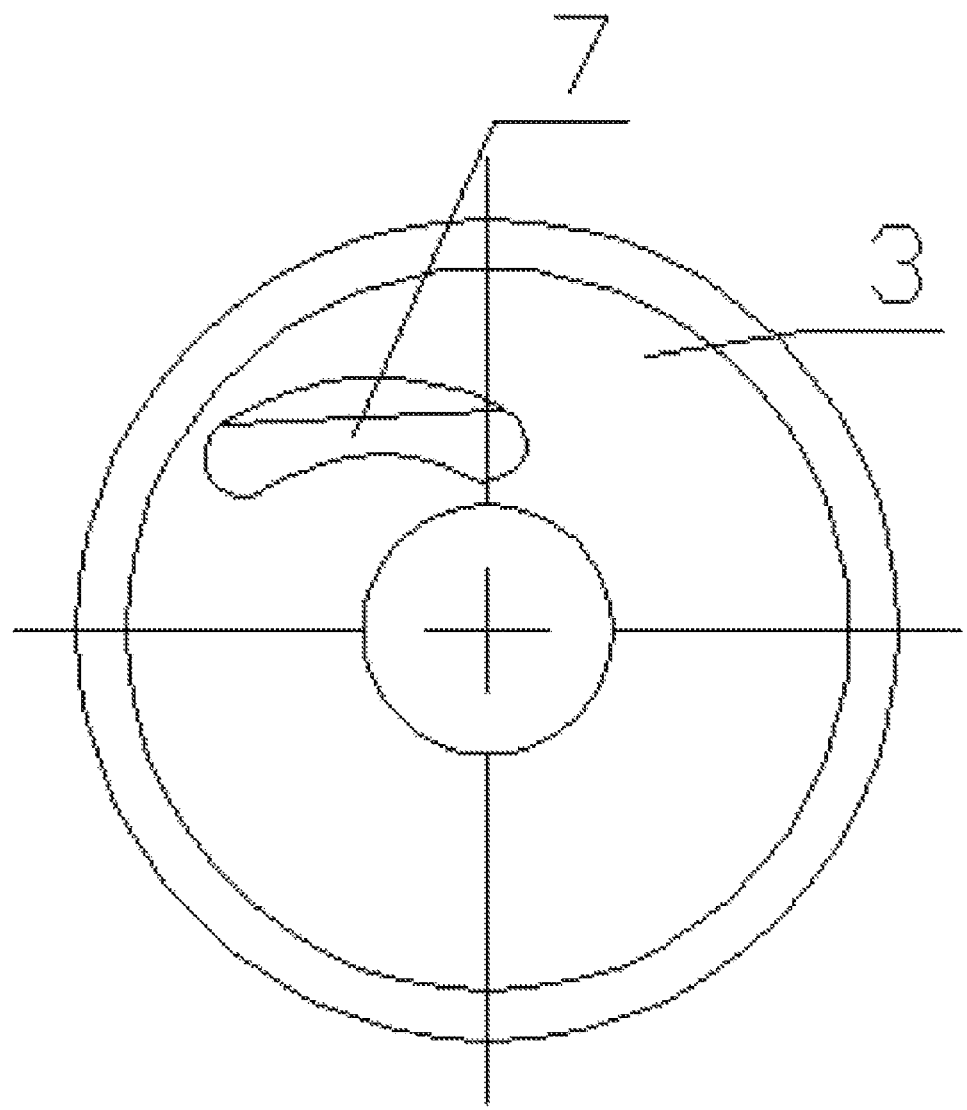
FIG. 4 is a structural schematic diagram of a knob according to Embodiment I.

As shown in FIGS. 1-4, the present invention includes the fixed plier handle 1 and the movable plier handle 2. The middle portion of the fixed plier handle 1 is integrally provided with the first rotating part 1.1, and the middle portion of the movable plier handle 2 is integrally provided with the second rotating part 2.1. The knob 3 is disposed on the outer side of the second rotating part 2.1. The first rotating part 1.1, the second rotating part 2.1 and the knob 3 are rotatably connected through the fixed shaft assembly 4. The fixed shaft assembly 4 includes the fixed shaft 4.1 and the fixed bolt 4.2 threadedly connected to each other. The first rotating part 1.1 and the second rotating part 2.1 are rotatably mounted on the fixed shaft 4.1. The knob 3 is rotatably mounted on the outer side of the first rotating part 1.1 through the fixed bolt 4.2. The outer end of the fixed shaft 4.1 is provided with the step 4.3, and the decorative ring 5 is sandwiched between the step 4.3 of the fixed shaft 4.1 and the second rotating part 2.1.

Straight slide grooves 6 are disposed between the second rotating part 2.1 and the first rotating part 1.1. The straight slide groove 6 on the second rotating part 2.1 and the straight slide groove 6 on the first rotating part 1.1 are overlapped with each other when the fixed plier handle 1 and the movable plier handle 2 are in a closed state. The inner end surface of the knob 3 is provided with the control groove 7, and the control groove 7 is in an arc shape. The locking pin 8 is inserted between the straight slide groove 6 on the second rotating part 2.1, the straight slide groove 6 on the first rotating part 1.1, and the control groove 7 of the knob 3. Both ends of the locking pin 8 are limited in the straight slide groove 6 of the second rotating part 2.1 and the control groove 7 of the knob 3, respectively. One end of the straight slide groove 6 of the second rotating part 2.1 is provided with the arc groove 9, and the arc groove 9 is communicated with the straight slide groove 6 and takes a rotation center of the fixed shaft assembly 4 as a center.

Figure 5:
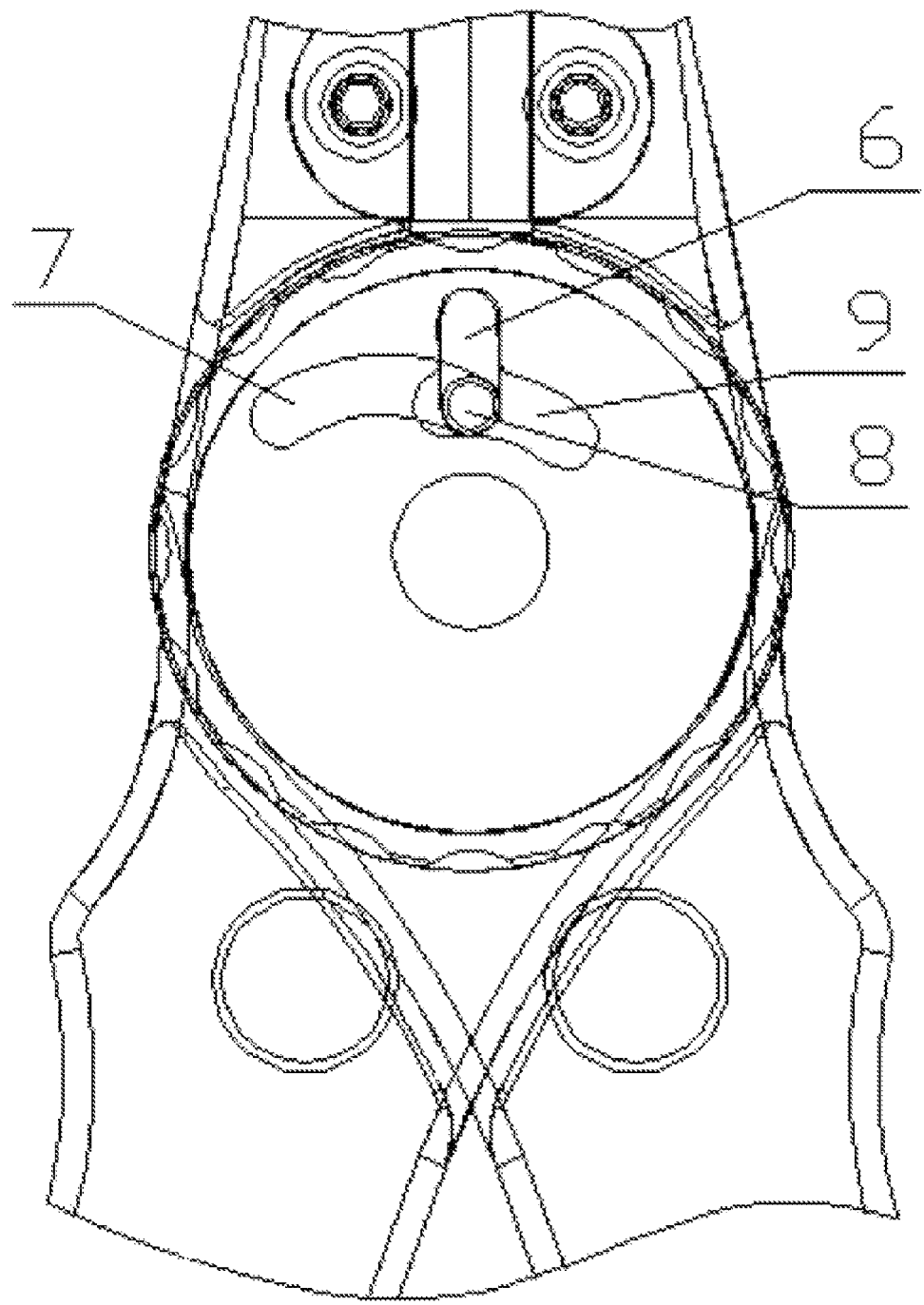
FIG. 5 is a structural schematic diagram of a locking mechanism in an openable and closable state according to Embodiment I.
Figure 6:
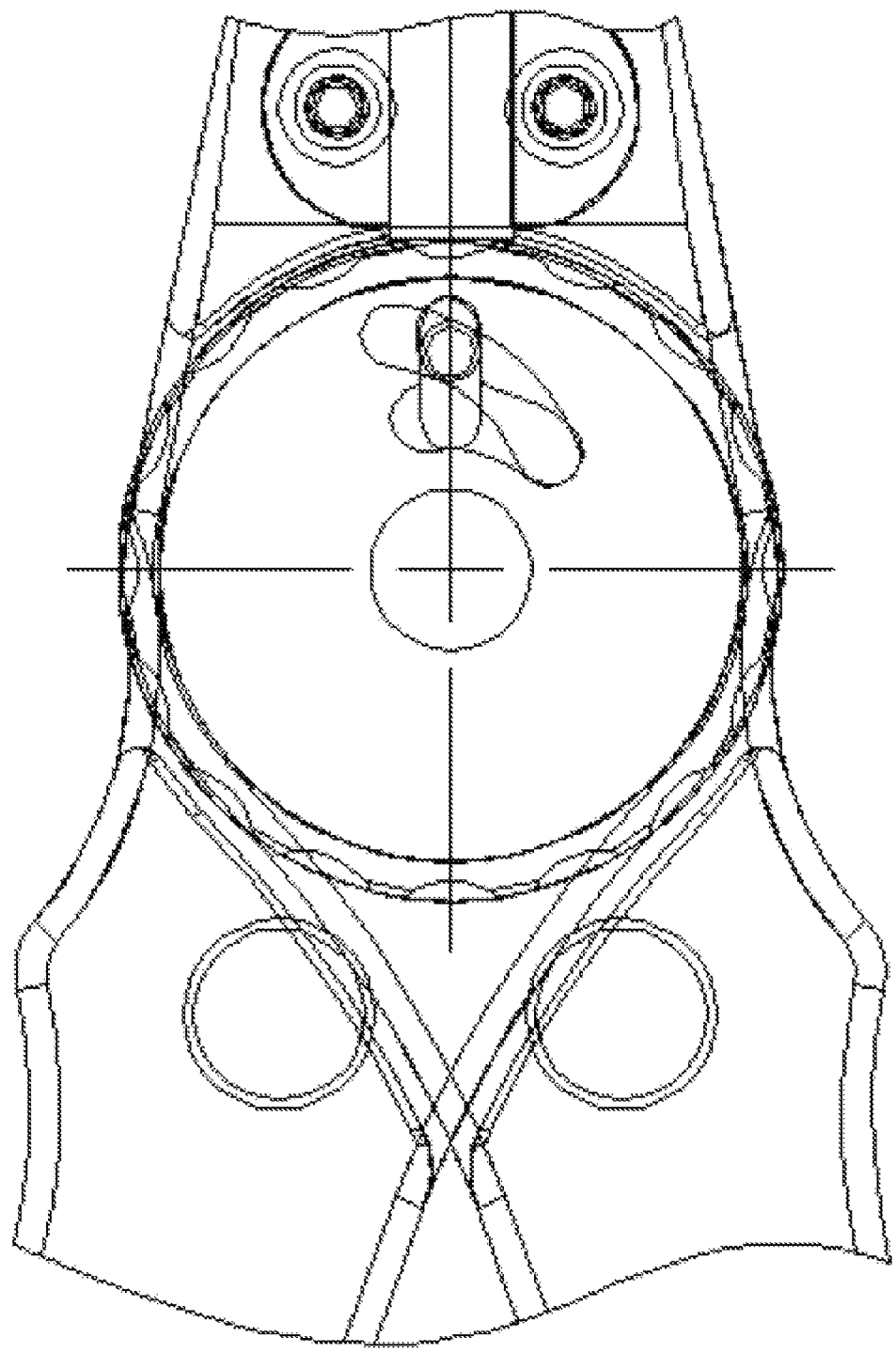
FIG. 6 is a structural schematic diagram of a locking mechanism in a locked state according to Embodiment I.

When the fixed plier handle 1 and the movable plier handle 2 are in the closed state, the knob 3 is rotated to drive the locking pin 8 to slide along the straight slide groove 6 of the second rotating part 2.1 and the straight slide groove 6 of the first rotating part 1.1 by the control groove 7. When the locking pin 8 slides to the end of the straight slide groove 6 far away from the arc groove 9 (shown in FIG. 6), the fixed plier handle 1 and the movable plier handle 2 are in the closed and locked state. When the locking pin 8 slides into the arc groove 9 communicated with the straight slide groove 6 (shown in FIG. 5), the arc groove 9 can slide along the locking pin 8, so that the movable plier handle 2 is in an openable and closable state.

Embodiment II

Figure 7:
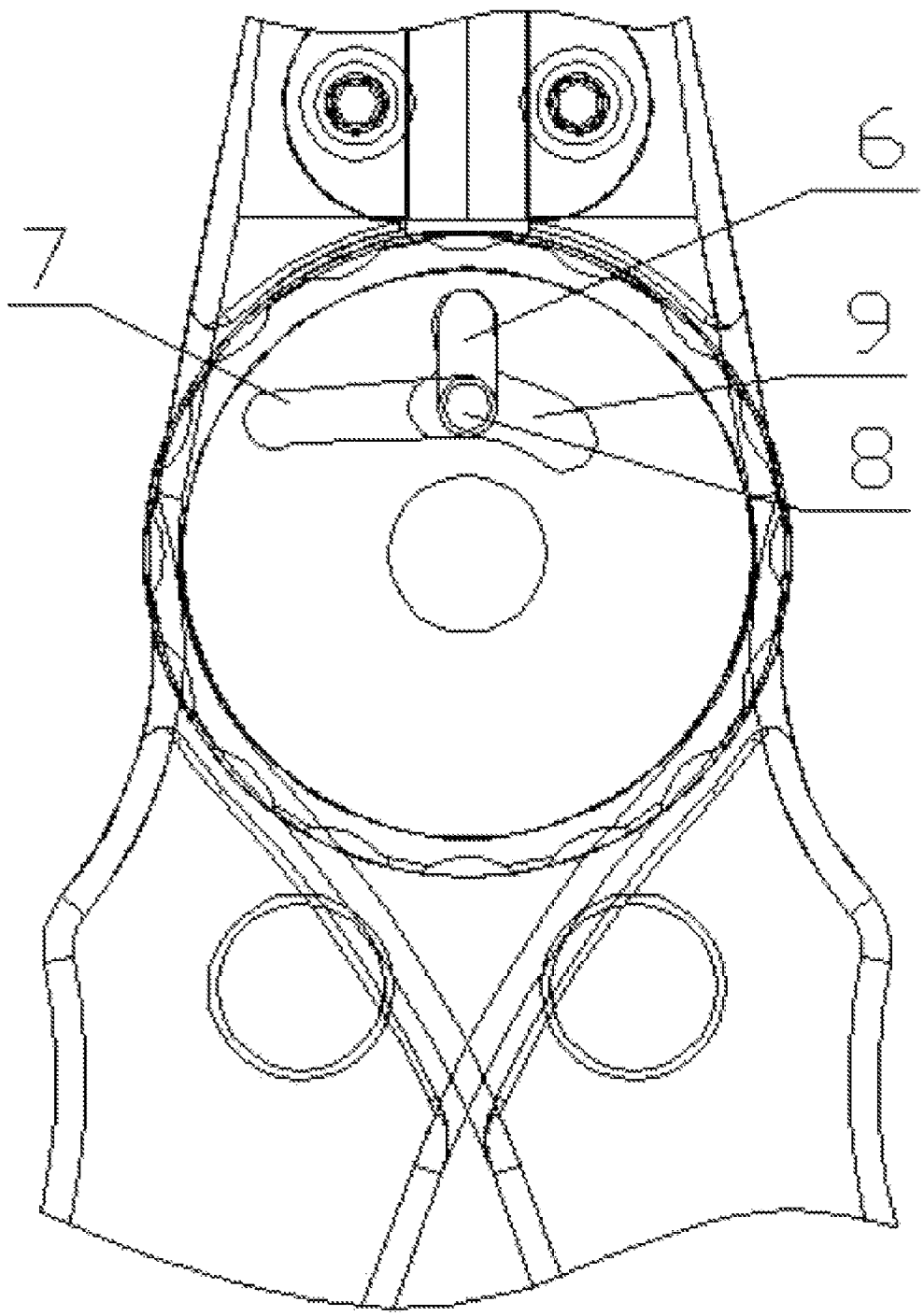
FIG. 7 is a structural schematic diagram of a locking mechanism in an openable and closable state according to Embodiment II.
Figure 8:
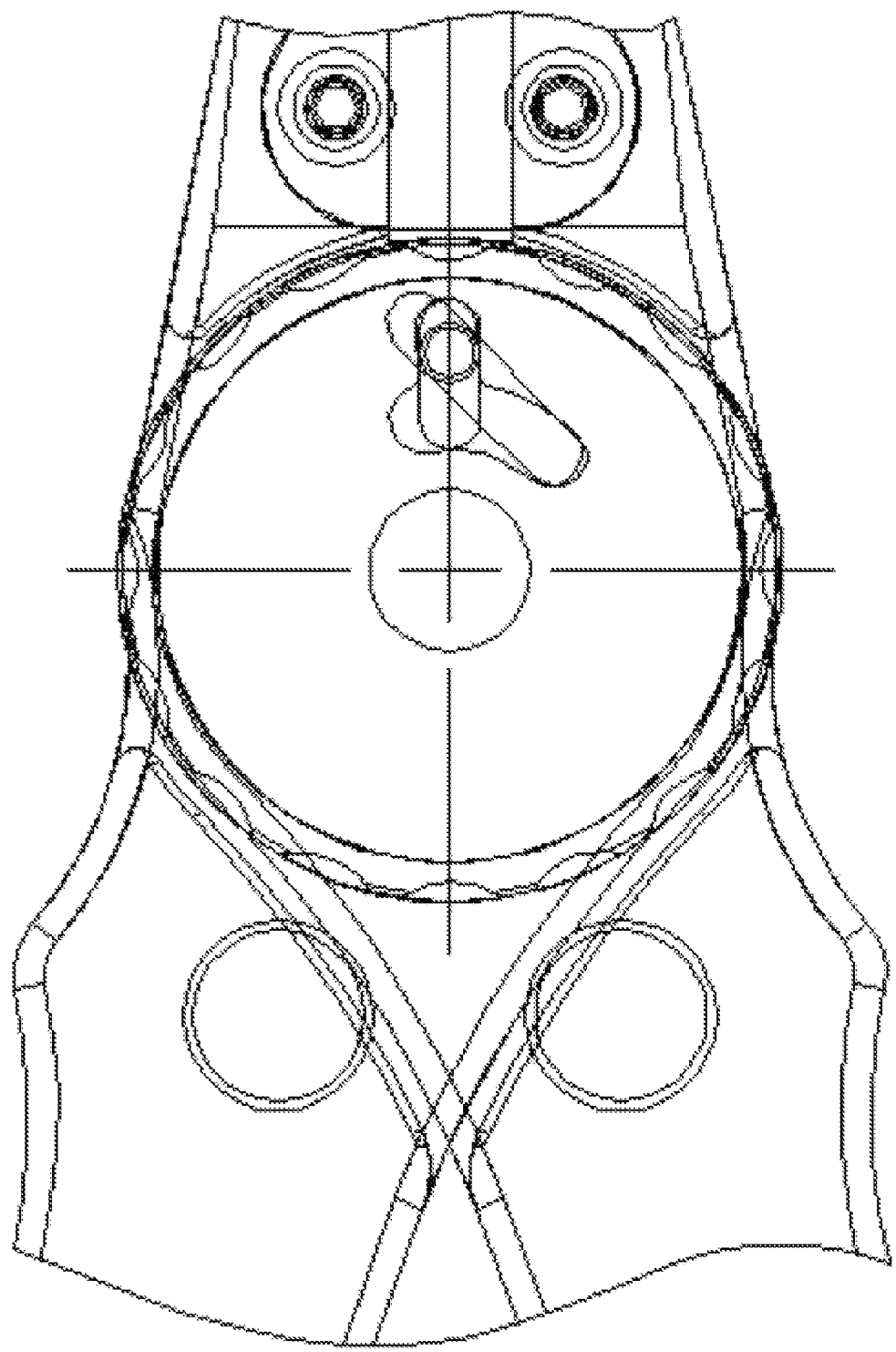
FIG. 8 is a structural schematic diagram of a locking mechanism in a locked state according to Embodiment II.

Embodiment II and Embodiment I are identical structurally, and the difference lies in: the control groove 7 of the inner end surface of the knob 3 is a straight groove, FIG. 7 is a structural schematic diagram of an openable and closable state according to the present embodiment, and FIG. 8 is a structural schematic diagram of a locked state according to the present embodiment.

What is claimed is:

1. A locking mechanism for enabling a fishing plier to remain a closed state, comprising a fixed plier handle and a movable plier handle; wherein
   a middle portion of the fixed plier handle is integrally provided with a first rotating part, and a middle portion of the movable plier handle is integrally provided with a second rotating part;
   the first rotating part and the second rotating part are rotatably connected through a fixed shaft assembly;
   a knob is disposed on an outer side of the first rotating part, and the knob is rotatably mounted on the fixed shaft assembly;
   a first straight slide groove is disposed on the first rotating part, and a second straight slide groove is disposed on the second rotating part;
   the second straight slide groove on the second rotating part and the first straight slide groove on the first rotating part are overlapped with each other when the fixed plier handle and the movable plier handle are in the closed state;
   an inner end surface of the knob is provided with a control groove;
   a locking pin is inserted between the second straight slide groove on the second rotating part, the first straight slide groove on the first rotating part, and the control groove of the knob;
   a first end of the second straight slide groove of the second rotating part is provided with a first arc groove;
   the first arc groove intersects with the second straight slide groove, and the first arc groove takes a rotation center of the fixed shaft assembly as a center;
   when the fixed plier handle and the movable plier handle are in the closed state, the knob is rotated to drive the locking pin to slide along the second straight slide groove of the second rotating part and the first straight slide groove of the first rotating part by the control groove; wherein
   when the locking pin slides to a second end of the second straight slide groove, the fixed plier handle and the movable plier handle are in a locked state and the second end of the second straight slide groove is located away from the first arc groove; and
   when the locking pin slides into where the first arc groove intersects with the second straight slide groove, the first arc groove slides along the locking pin to enable the movable plier handle to be in an openable and closable state.

2. The locking mechanism according to claim 1, wherein the fixed shaft assembly comprises a fixed shaft and a fixed bolt, and the fixed shaft and the fixed bolt are threadedly connected to each other;
   the first rotating part and the second rotating part are rotatably mounted on the fixed shaft; and
   the knob is rotatably mounted on the outer side of the first rotating part through the fixed bolt.

3. The locking mechanism according to claim 2, wherein an outer end of the fixed shaft is provided with a step, and a decorative ring is sandwiched between the step of the fixed shaft and the second rotating part.

4. The locking mechanism according to claim 1, wherein the control groove is a second arc groove or a straight groove.

* * * * *